US010596911B2

(12) United States Patent
Hähre et al.

(10) Patent No.: US 10,596,911 B2
(45) Date of Patent: Mar. 24, 2020

(54) POWER ELECTRONIC SYSTEM FOR AN ELECTRICITY CHARGING STATION AND CORRESPONDING ELECTRICITY CHARGING STATION

(71) Applicant: Dr. Ing. h.c. F. Porsche Aktiengesellschaft, Stuttgart (DE)

(72) Inventors: Karsten Hähre, Dudenhofen (DE); Raoul Heyne, Goslar (DE); Christian Metzger, Tamm (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 0 days.

(21) Appl. No.: 16/030,072

(22) Filed: Jul. 9, 2018

(65) Prior Publication Data

US 2019/0016224 A1  Jan. 17, 2019

(30) Foreign Application Priority Data

Jul. 12, 2017 (DE) .................. 10 2017 115 632

(51) Int. Cl.
*H02J 7/00* (2006.01)
*B60L 11/18* (2006.01)
(Continued)

(52) U.S. Cl.
CPC ........... *B60L 11/1825* (2013.01); *B60L 53/14* (2019.02); *B60L 53/31* (2019.02); *H02G 3/081* (2013.01);
(Continued)

(58) Field of Classification Search
CPC ... Y02T 90/14; Y02T 10/7005; Y02T 90/128; Y02T 10/7088; Y02T 90/163
See application file for complete search history.

(56) References Cited

U.S. PATENT DOCUMENTS 5,969,938 A   10/1999  Byrne et al.
8,094,435 B2   1/2012  Howes et al.
(Continued)

FOREIGN PATENT DOCUMENTS

CN    201966504 U    9/2011
CN    204559201 U    8/2015
(Continued)

OTHER PUBLICATIONS

German Search Report for German Application No. 10 2017 115 632.1, dated Jul. 5, 2018 with partial English translation, 8 pages.
(Continued)

*Primary Examiner* — Arun C Williams
(74) *Attorney, Agent, or Firm* — RatnerPrestia

(57) ABSTRACT

A power electronic system for an electricity charging station having the following features: first busbars for feeding in an alternating current, second busbars for conducting away a direct current, a third busbar for grounding the system, ground cables connected to the first busbars, the second busbars and the third busbar, and power electronic assemblies for converting the alternating current into the direct current. The invention furthermore provides an electricity charging station including such a power electronic system.

8 Claims, 5 Drawing Sheets

(51) Int. Cl.
*H02G 5/08* (2006.01)
*H02G 3/08* (2006.01)
*B60L 53/31* (2019.01)
*B60L 53/14* (2019.01)

(52) U.S. Cl.
CPC .............. *H02G 5/08* (2013.01); *H02J 7/0027* (2013.01); *B60L 2210/10* (2013.01); *B60L 2210/30* (2013.01); *H02J 7/0029* (2013.01); *H02J 2007/0039* (2013.01)

(56) References Cited

U.S. PATENT DOCUMENTS

| | | | |
|---|---|---|---|
| 8,363,387 | B2 | 1/2013 | Vanhytte et al. |
| 2011/0176343 | A1* | 7/2011 | Kojima .................. B60L 53/52 363/132 |
| 2012/0170175 | A1 | 7/2012 | Silberbauer et al. |
| 2013/0278225 | A1* | 10/2013 | Dietze ..................... H02J 7/045 320/137 |
| 2013/0307477 | A1* | 11/2013 | Reinschke .............. B60L 53/30 320/109 |
| 2015/0180234 | A1* | 6/2015 | Bailey ....................... H02J 1/10 307/12 |

FOREIGN PATENT DOCUMENTS

| | | |
|---|---|---|
| CN | 105337382 A | 2/2016 |
| DE | 102009051518 B3 | 5/2011 |
| EP | 2657063 A1 | 10/2013 |

OTHER PUBLICATIONS

Chinese Office Action for Chinese Application No. 201810750908.2, dated Oct. 15, 2019, 7 pages.

* cited by examiner

POWER ELECTRONIC SYSTEM FOR AN ELECTRICITY CHARGING STATION AND CORRESPONDING ELECTRICITY CHARGING STATION

CROSS-REFERENCE TO RELATED APPLICATION

This application claims priority to German Patent Application No. DE 10 2017 115 632.1, filed Jul. 12, 2017, which is incorporated by reference herein in its entirety.

FIELD OF THE INVENTION

The present invention relates to a power electronic system for an electricity charging station. The present invention furthermore relates to an electricity charging station comprising such a system.

BACKGROUND OF THE INVENTION

In electrical engineering, the term charging station denotes any stationary apparatus or electrical installation which serves to feed energy to mobile rechargeable battery-operated devices, machines or motor vehicles by simple positioning or plugging-in, without having to remove the energy storage—for instance the traction battery of an electric automobile. Charging stations for electric automobiles are colloquially also referred to as "electricity charging stations" and can comprise a plurality of charging points, which are characterized as "charging columns" depending on the design.

Known systems here include, particularly, DC rapid charging systems (high performance charging, HPC) in accordance with IEC 61851-23, which is incorporated by reference herein, such as the so-called combined charging system (CCS) widely used in Europe. In DC charging of the generic type, direct current is fed from the charging column directly into the vehicle and, for this purpose, is provided from the electricity grid by means of a powerful rectifier or at solar charging stations by means of large buffer rechargeable batteries. In the vehicle there is generally an OBC (On Board Charger) control unit. The latter communicates with the charging column and the battery management control unit.

According to the prior art, the power electronics required for this purpose are usually integrated in the charging column and have a loading capacity up to a power limit of 50 kW. Since the DC connections of the charging column are directly connected to corresponding connections of the traction battery, high charging currents can thus be transmitted with low losses, which enables short charging times.

US 2013307477, which is incorporated by reference herein, discloses a separate container for the power electronics. Said container has a power connection, for example a sealable screw connection, to which the power feed for supplying the charging station with electrical energy can be connected. Additionally or alternatively, a cable connection is provided, to which the charging cable can be connected. A charging station comprising such a container is intended to be prefabricated before being delivered and connected without the need to intervene in the interior of the charging station during installation.

Nevertheless, the container has a maintenance hatch, by means of which said container can be opened and closed as necessary. Via said maintenance hatch, by way of example, the electrical or electronic components, or parts thereof, that are directly required for charging the electric vehicle can be lifted as a unit from the container without electrical connection cables having to be released. Furthermore, at least upon the partial removal of components, the container is accessible via the maintenance hatch, such that maintenance work possibly required can be carried out.

SUMMARY OF THE INVENTION

The invention provides a power electronic system for an electric charging station and also an electricity charging station equipped with such a system as claimed in the independent claims.

The approach according to aspects of the invention is based on the concept of installing the power electronic system required for converting the electrical energy in a mounting rack which has a width of 48.26 cm in accordance with the so-called 19-inch design (19-inch rack) standardized in EIA 310-D, which is incorporated by reference herein, IEC 60297, which is incorporated by reference herein, and DIN 41494 SC48D, which is incorporated by reference herein. The power electronics can thus be distributed modularly among a plurality of relatively small 19-inch assemblies ("slide-in units"). The high power density of such systems requires a compact mounting possibility for the 19-inch slide-in units. The service concept additionally requires a rapid and simple mounting and/or exchange possibility for the 19-inch slide-in units both during initial mounting and during operation.

The proposed apparatus is based on the insight here that the power path within such a system proves to be crucial for the ease of maintenance, electromagnetic compatibility (EMC), efficiency, structural size, heat dissipation and robustness of said system. One particular challenge here is the objective of providing a system that is readily accessible by means of a front-side opening.

One advantage of this solution resides in the optimized power path thereof, which provides the system according to aspects of the invention and its assemblies with excellent ease of maintenance, electromagnetic compatibility (EMC) and high overall efficiency. One embodiment of the invention is distinguished moreover by its small structural size, diverse cooling possibilities and extremely high robustness.

Further advantageous configurations of the invention are specified in the dependent patent claims. In this regard, the power path can extend from the front-side AC input of the system through a connection box to the housing rear wall, up the housing rear wall, in a horseshoe-shaped fashion through a plurality of parallel-connected assemblies, down the housing rear wall and through the connection box to the front-side DC output. A corresponding embodiment is particularly readily accessible to maintenance personnel through its front-side opening.

BRIEF DESCRIPTION OF THE DRAWINGS

One exemplary embodiment of the invention is illustrated in the drawings and is described in greater detail below.

DETAILED DESCRIPTION OF THE INVENTION N

Figure 1:
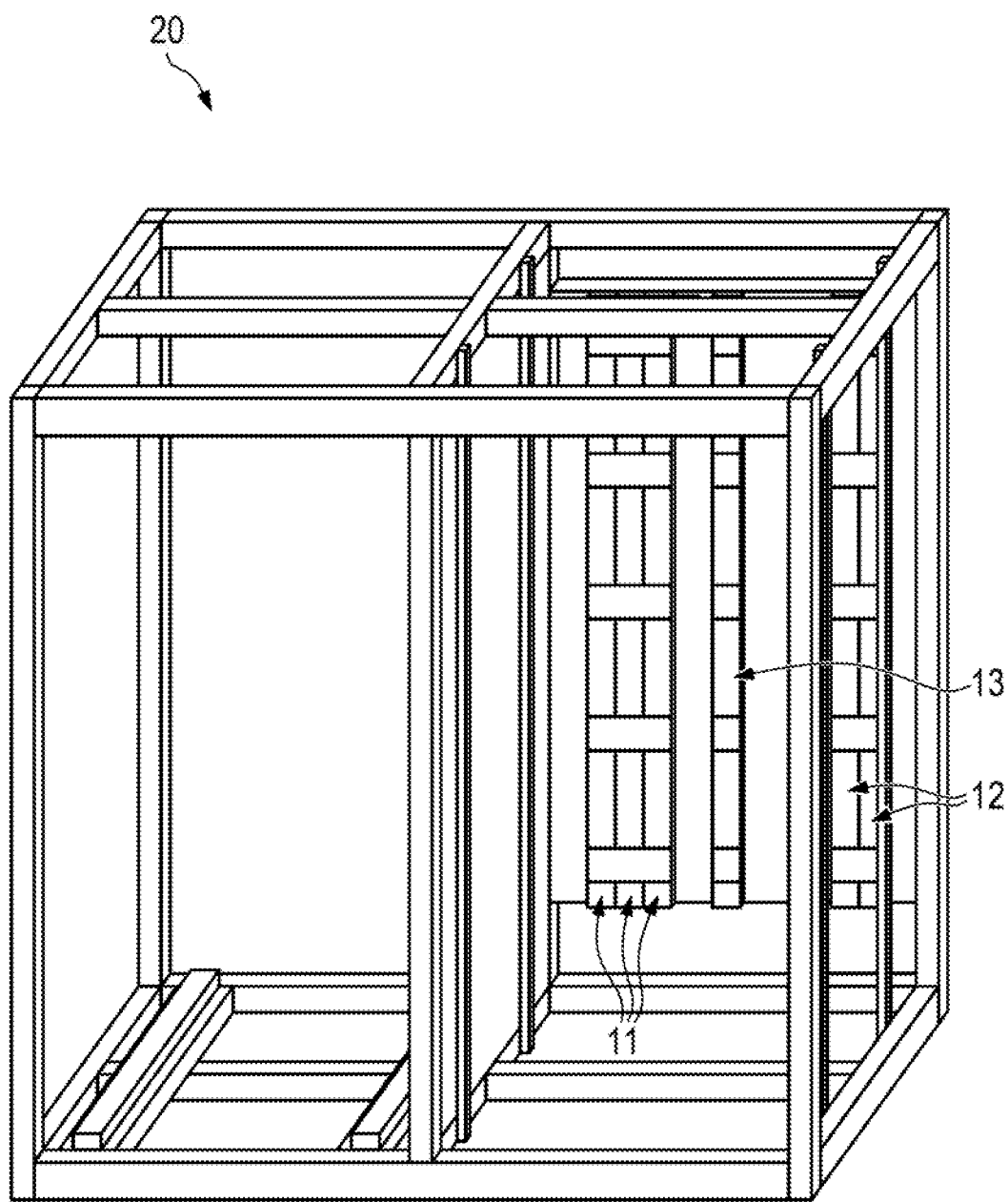
FIG. 1 shows the perspective view of the mounting rack of a power electronic system according to aspects of the invention.

FIG. 1 illustrates the construction of a mounting rack (20) according to aspects of the invention and reveals a first set of busbars (11) for feeding in alternating current, a second set of busbars (12) for collecting and conducting away the direct current of a plurality of slide-in units, and also a third, continuous protective conductor rail (13), which connects all slide-in units to the ground potential.

Figure 2:
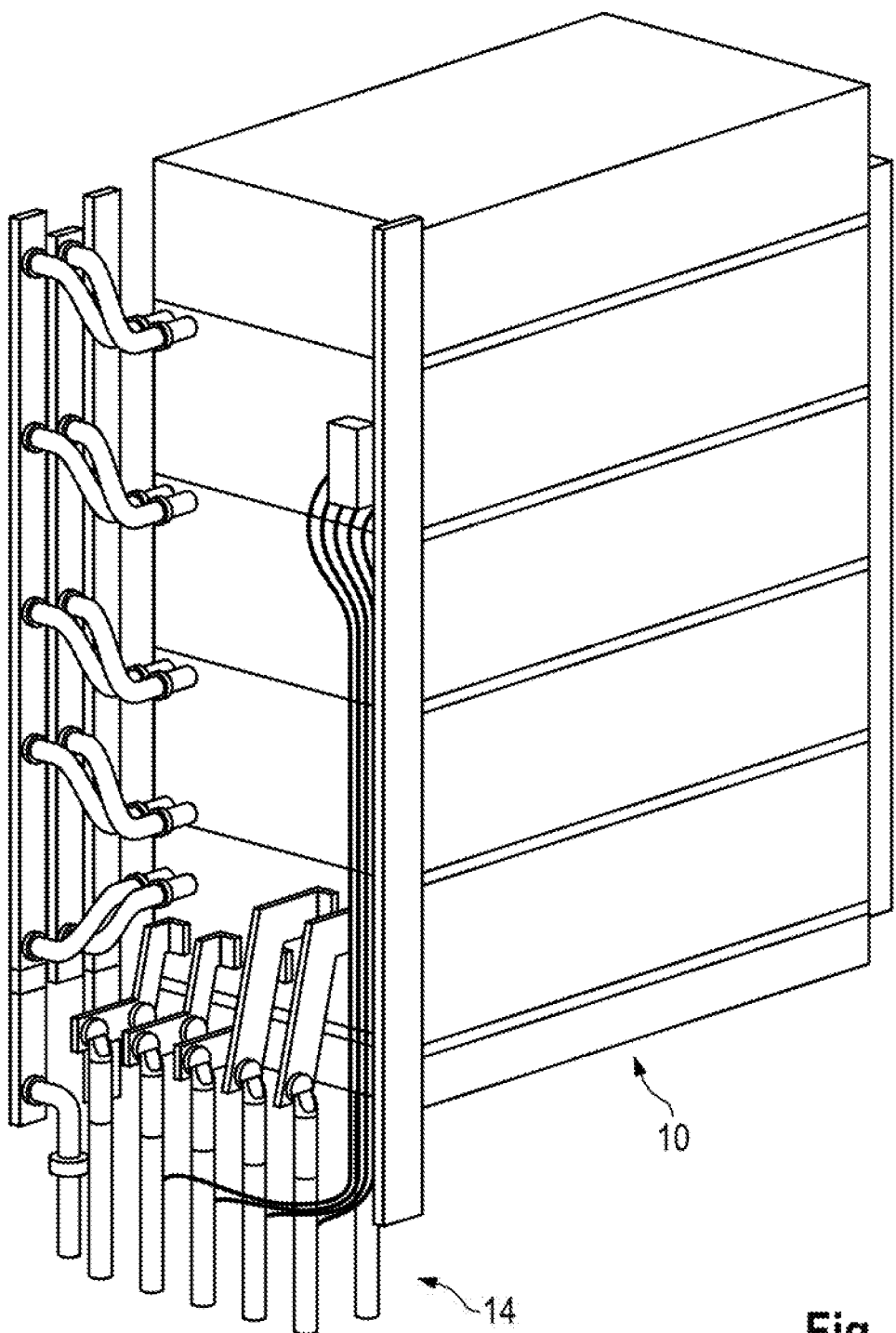
FIG. 2 shows a perspective view of the system without a mounting rack.

FIG. 2 shows said slide-in units (10, 14) in the incorporated state: in specific detail, the present embodiment involves four power electronic assemblies (15) for converting the alternating current into the direct current and also a connection box (30), which is connected to front-side ground cables (14) via the first busbars (11)—concealed by the assemblies (15) themselves in FIG. 2—, the second busbars (12) and the third busbar (13).

Figure 3:
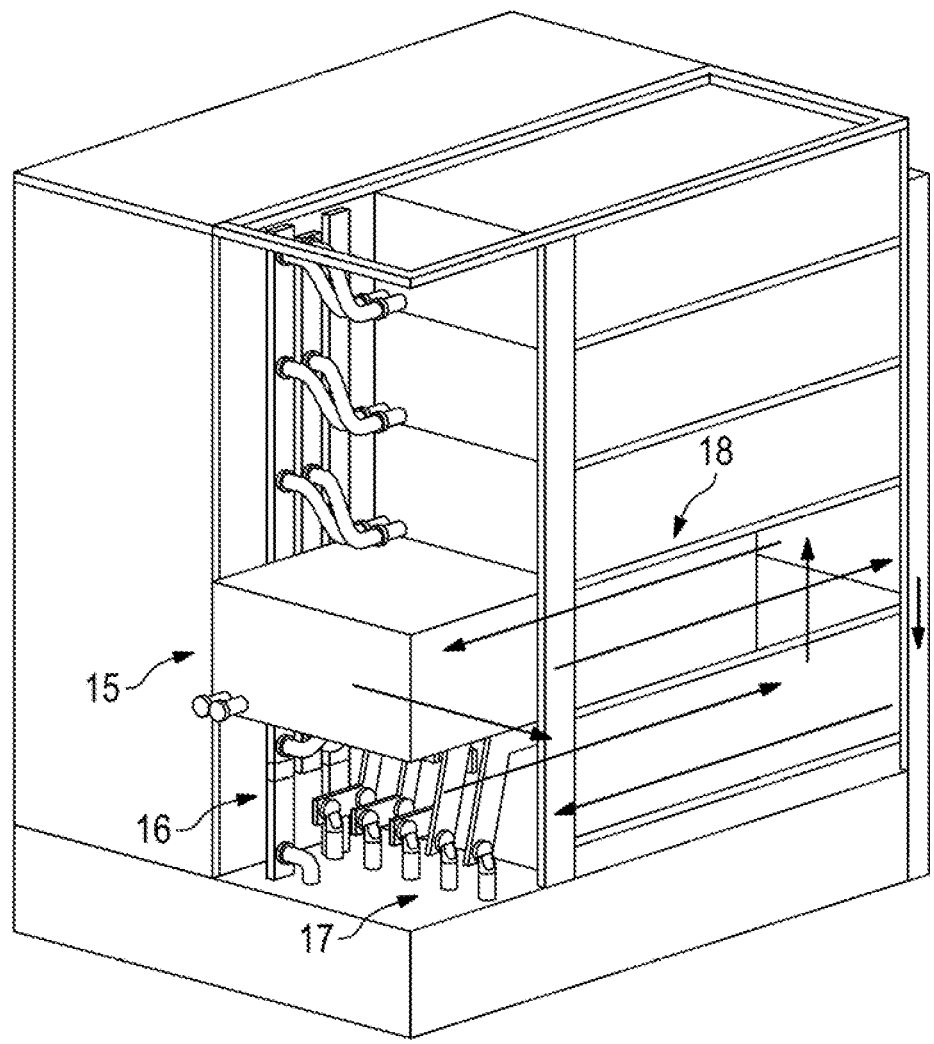
FIG. 3 shows a view of the overall system corresponding to FIG. 2.

FIG. 3, from a viewing angle corresponding to FIG. 2, reproduces the overall system (10) with a partly withdrawn assembly (15). The rough power path (18) is already discernible here, which extends essentially from an AC input (16) of the connection box (30), said AC input being on the front side in accordance with the illustration, through the latter as far as the housing rear wall of the mounting rack (20), via the first busbars (11) up the housing rear wall, in a horseshoe-shaped fashion through the assembly (15) to the second busbers (12), via the latter down the housing rear wall again and from there once again through the connection box (30) to the front-side DC output (17) of the connection box (30).

Figure 4:
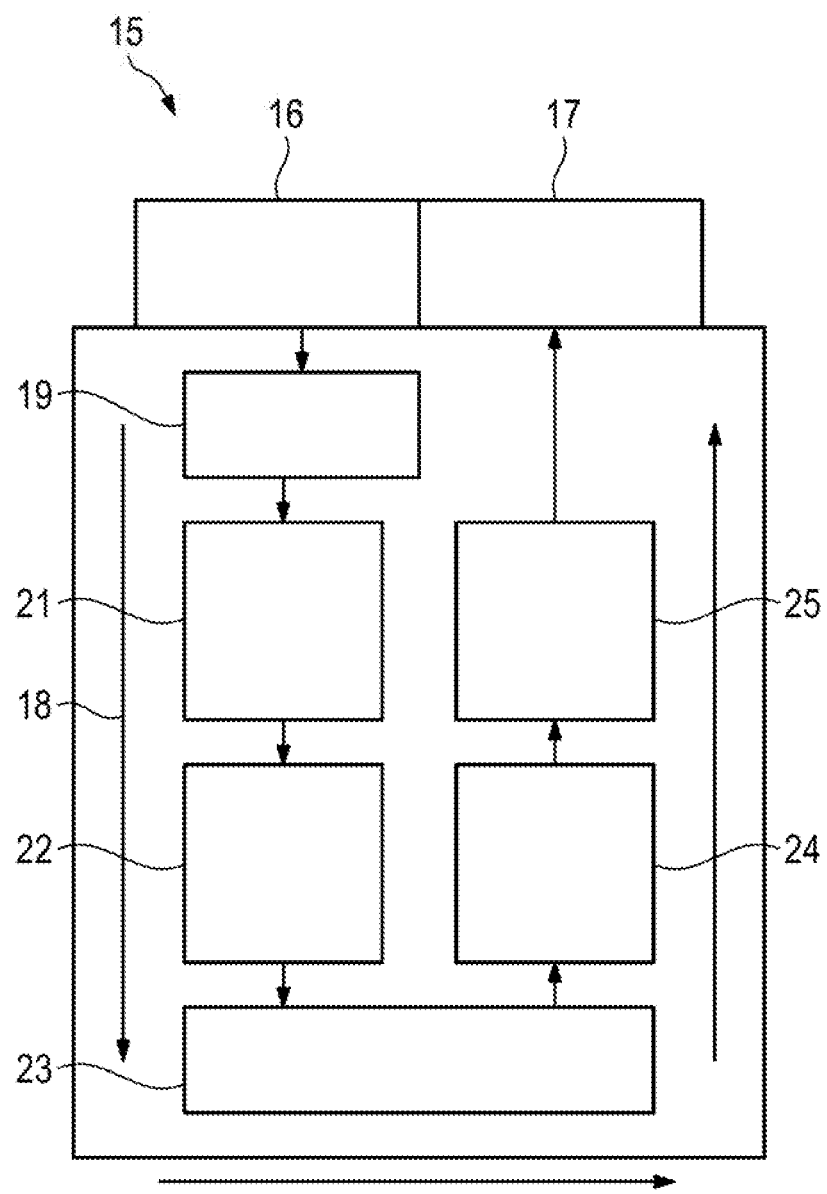
FIG. 4 shows the schematic plan view of an assembly of the system.

The course of the power path (18) within the assembly (15) can be gathered here from FIG. 4: it leads therein via an overcurrent protection device (19), a first AC filter (21) and also the active rectifier (22) into a DC link circuit (23) arranged along the front side of the assembly (15). From here the power passes through a DC-DC converter (24) and a first DC filter (25) before it is output from the assembly (15) to the second busbars (12). The DC link circuit (23) can also be arranged between rectifier (22) and DC-DC converter (24). This then also results in a horseshoe shape.

Figure 5:
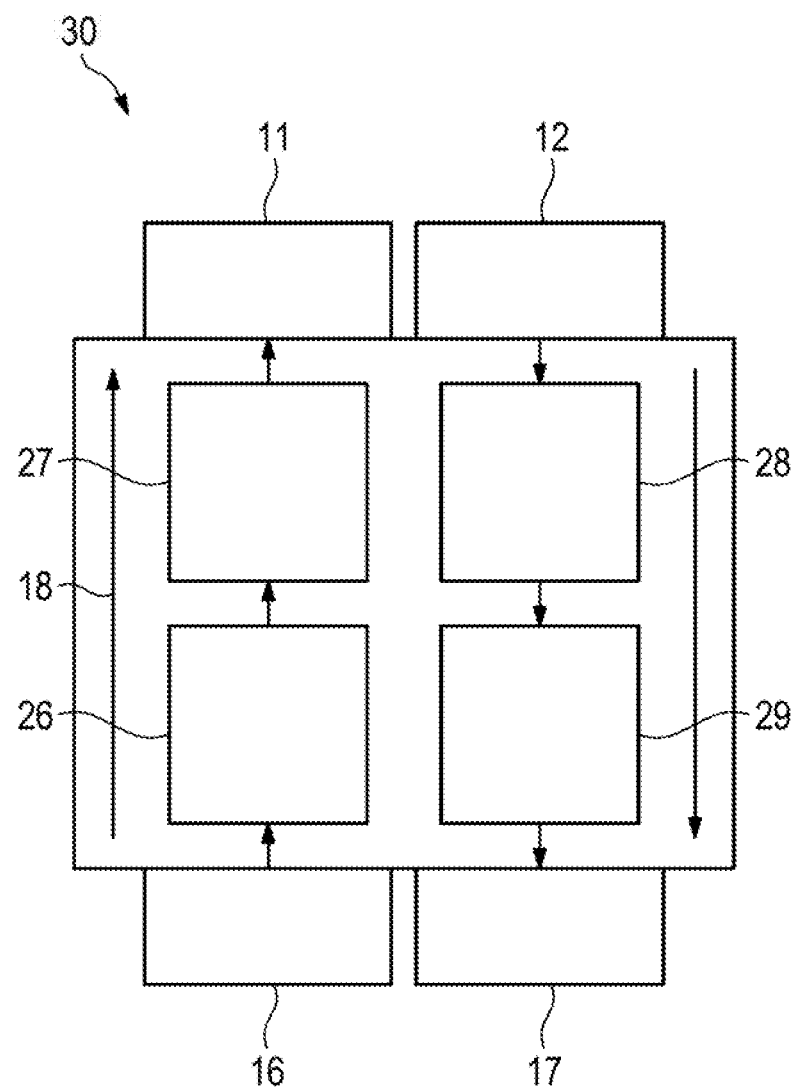
FIG. 5 shows the schematic plan view of its connection box.

Finally, FIG. 5 illustrates the double power path (18) through the connection box (30): here it leads firstly from the AC input (16) via an optional second AC voltage filter (26) and an AC voltage contactor (27) to the first busbars (11) and secondly from the second busbars (12) via a DC voltage contactor (28) and optional second DC voltage filter (29) back to the front-side DC output (17). From there the direct current can be output as necessary for charging electric automobiles via the ground cables (14) to charging columns of the electricity charging station which are connected to the system (10).

What is claimed is:

1. A power electronic system for an electricity charging station, the power electronic system comprising:
    first busbars for feeding in an alternating current (AC);
    second busbars for conducting away a direct current (DC);
    a third busbar for grounding the system;
    ground cables connected to the first busbars, the second busbars, and the third busbar,
    an AC input;
    a DC output;
    a plurality of power electronic assemblies for converting the alternating current into the direct current, each power electronic assembly including a first AC filter, a rectifier, a link circuit, a DC-DC converter, and a first DC filter; and
    a power path extending within each power electronic assembly via the first AC filter, the rectifier, the link circuit, the DC-DC converter, and the first DC filter.

2. The power electronic system as claimed in claim 1, wherein:
    each power electronic assembly comprises an overcurrent protection device disposed upstream of the first AC filter on the power path.

3. The power electronic system as claimed in claim 1, further comprising:
    a mounting rack and a connection box,
    wherein the mounting rack carries the busbars, the power electronic assemblies, and the connection box.

4. The power electronic system as claimed in claim 3, wherein:
    the connection box comprises a second AC voltage filter, an AC voltage contactor, a DC voltage contactor, and a second DC voltage filter, and
    the power path extends within the connection box firstly via the second AC voltage filter and the AC voltage contactor and secondly via the DC voltage contactor and the second DC voltage filter.

5. The power electronic system as claimed in claim 3, wherein:
    the power electronic assemblies connect the first busbars to the second busbars, and
    the connection box comprises the AC input and the DC output.

6. The power electronic system as claimed in claim 5, wherein:
    the mounting rack has a housing rear wall facing away from the ground cables, and the housing rear wall carries the busbars.

7. The power electronic system as claimed in claim 5, wherein:
    the third busbar has a star- or tree-shaped connection to a main grounding point,
    the power path extends from the AC input through the connection box to the housing rear wall,
    the power path extends via the first busbars up the housing rear wall,
    the power path extends from the first busbars in a horseshoe-shaped fashion through the assemblies to the second busbars,
    the power path extends via the second busbars down the housing rear wall, and
    the power path extends from the housing rear wall once again through the connection box to the DC output.

8. An electricity charging station, comprising:
    a power electronic system as claimed in claim 1 for rectifying the alternating current, and
    charging columns connected to the power electronic system and for charging electric automobiles with the direct current.

* * * * *